March 20, 1962 G. F. DENNLER 3,026,059
REEL LOADING AND UNLOADING APPARATUS
Filed May 16, 1960 4 Sheets-Sheet 1

INVENTOR.
George F. Dennler
BY

March 20, 1962  G. F. DENNLER  3,026,059
REEL LOADING AND UNLOADING APPARATUS
Filed May 16, 1960  4 Sheets-Sheet 2
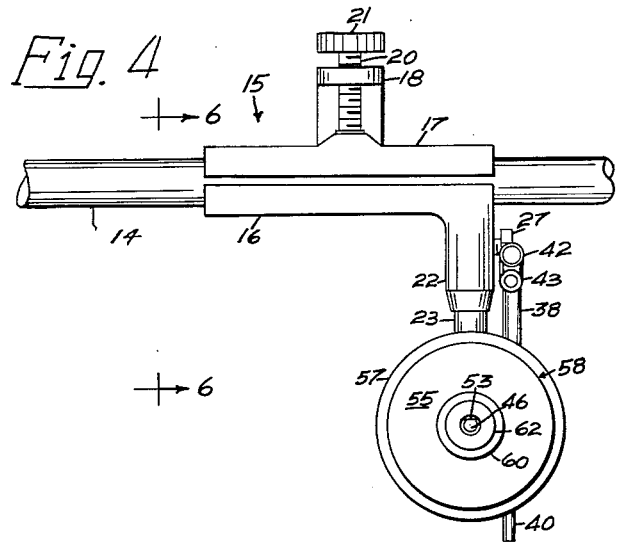
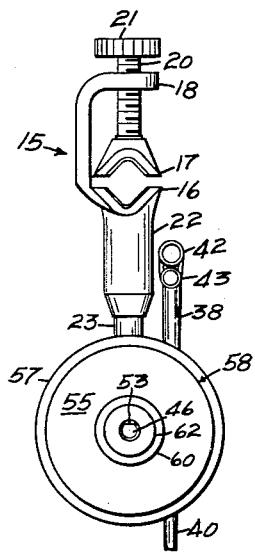
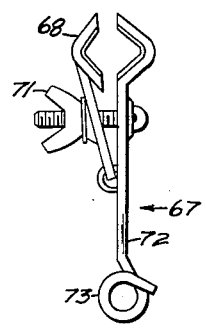
INVENTOR.
George F. Dennler
BY
Atty.

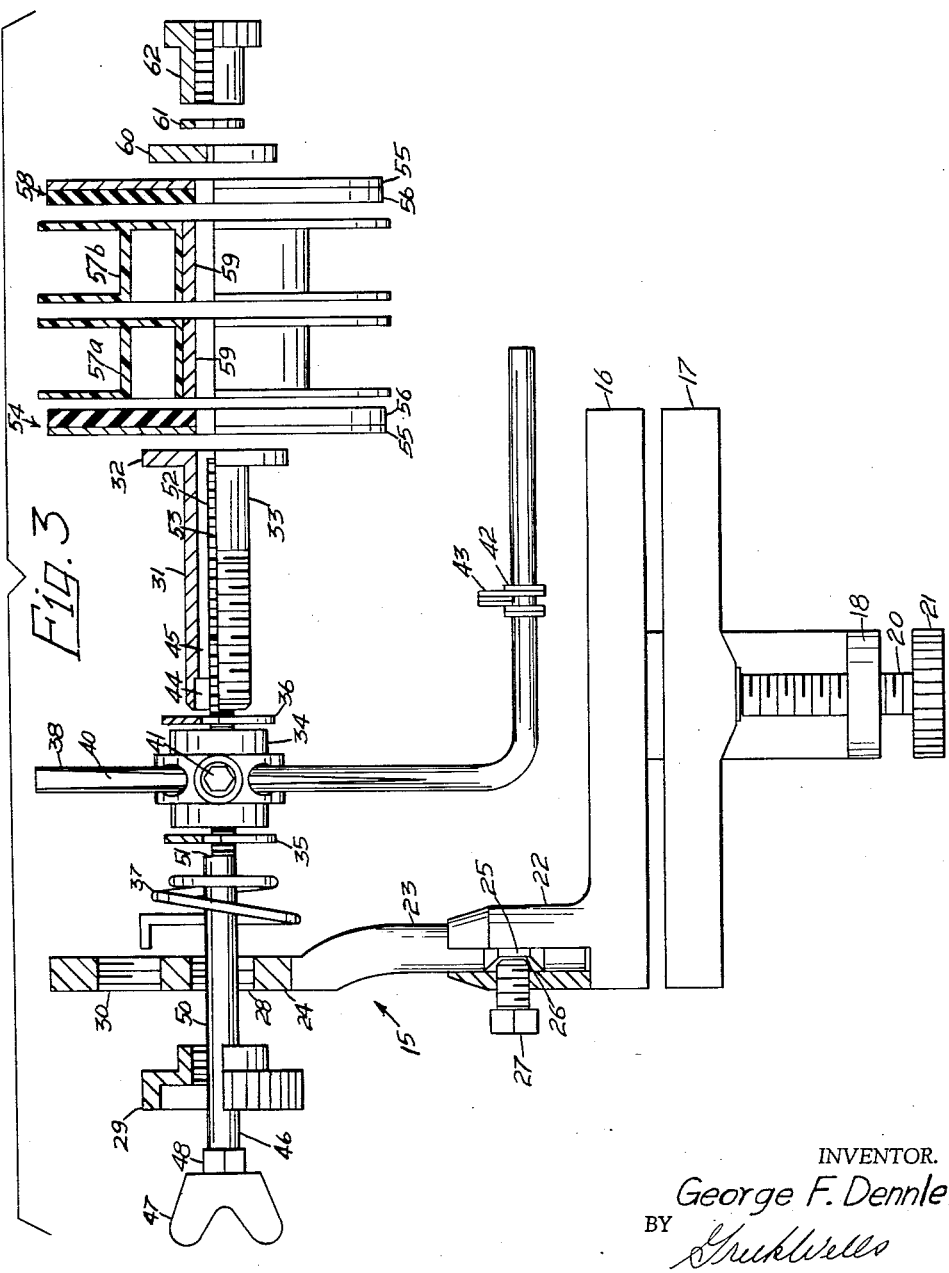

March 20, 1962     G. F. DENNLER     3,026,059
REEL LOADING AND UNLOADING APPARATUS
Filed May 16, 1960                         4 Sheets-Sheet 4
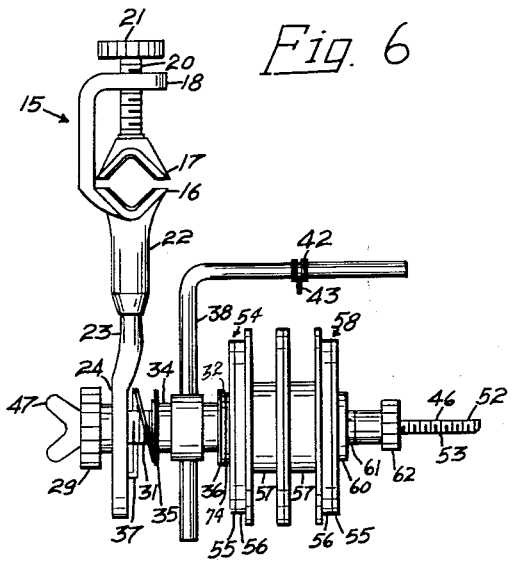
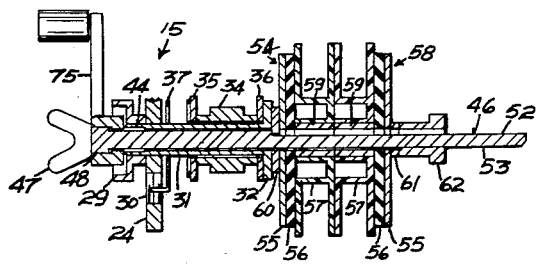
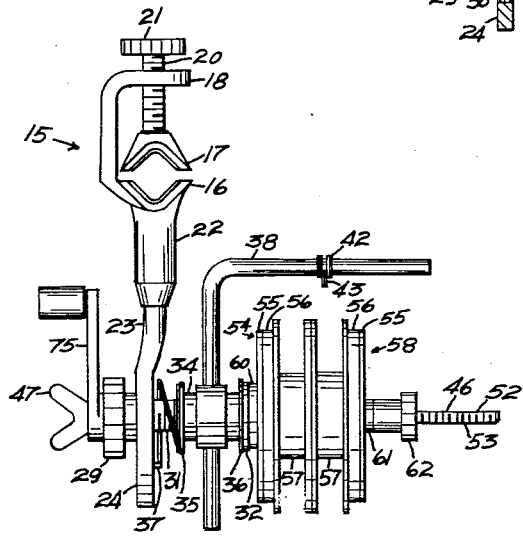
INVENTOR.
George F. Dennler
BY
Atty.

United States Patent Office 3,026,059
Patented Mar. 20, 1962

3,026,059
REEL LOADING AND UNLOADING APPARATUS
George F. Dennler, Juliaetta, Idaho
Filed May 16, 1960, Ser. No. 29,477
3 Claims. (Cl. 242—84.5)

This invention relates to a novel device for loading and unloading fishing reels.

The loading of fishing line onto reels poses many problems to the average sports fisherman. It is imperative that the line be placed on the reel spool without twisting the line, which would result in kinked area when the line is cast. This is particularly baffling in the case of spinning reels having stationary spools around which the line is fed by a revolving bail. Often line will inadvertently be placed on a spinning reel so as to actually twist the line as it goes on the spool. The spool of line should be held parallel to the reel spool in order to provide direct transfer of the line without twisting. This creates a problem in providing proper support of both the spool and the reel.

It is an object of this invention to provide a device which will easily mount upon a fishing rod and which will hold line in the proper position and attitude for being fed onto any of the popular reels which are in common usage. It is one object to provide a device which will hold a stationary spool of line parallel to a spinning reel spool and will feed the line from a bail to the reel bail so as to prevent twisting of the line during transfer.

It is another object of this invention to provide an apparatus which can easily be adapted for use in either loading or unloading level-wind reels.

These and still further objects will be evident from a study of the following specification and the accompanying drawings which show a preferred embodiment of the invention. This embodiment is merely exemplary of the many possibilities which might present themselves to one trained in this art within the purview of the invention. It is not intended to limit the breadth of the invention as defined by the annexed claims.

In the drawings:

FIGURE 2 is a view of the apparatus taken along line 2—2 in FIGURE 1;

FIGURE 3 is an exploded side view of the loading apparatus with portions shown in section;

FIGURE 4 is a side view of the apparatus arranged on a fishing rod to load line onto a level-wind reel;

FIGURE 5 is a front view of the guide;

FIGURE 6 is a front view of the apparatus taken along line 6—6 in FIGURE 4;

FIGURE 7 is a view similar to FIGURE 6 showing the apparatus arranged to unload line from a level-wind reel; and FIGURE 8 is a vertical section view through the apparatus as arranged in FIGURE 7.

Figure 1:
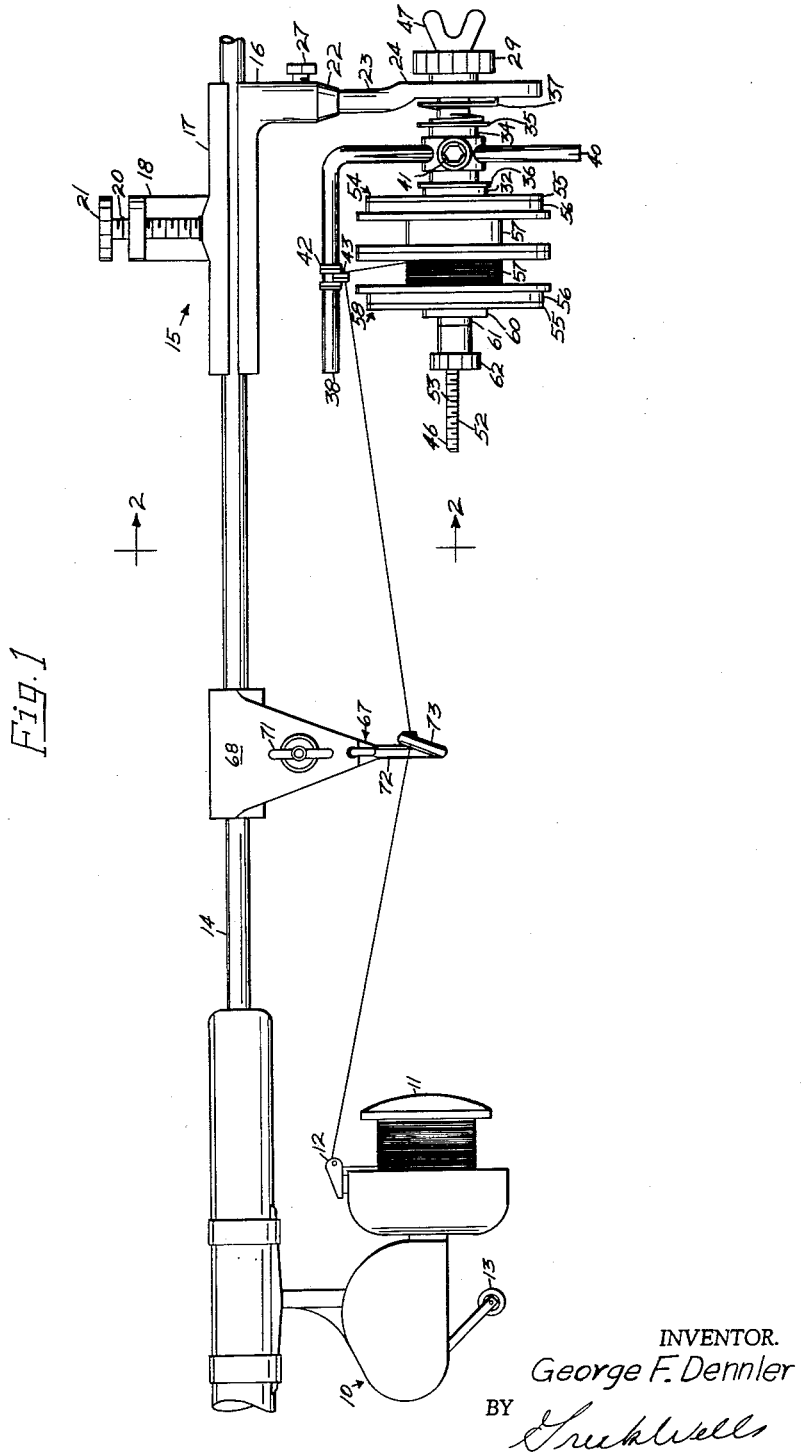
FIGURE 1 is a side view of the apparatus mounted on a spinning rod and arranged for loading line onto the spinning reel.

Referring now to the drawings and to FIGURES 1–3 in particular, the loading and unloading apparatus is shown in position for dispensing fishing line onto a spinning reel 10 having a reciprocating non-revolvable spool 11. Line is fed to spool 11 by means of a revolvable bail 12 which is actuated manually by means of a handle 13. This type of reel is quite common and is extremely popular with modern sport fishermen. The specific features of the reel 10 are unimportant, since this apparatus is equally well-suited for the loading of any spinning reel.

The reel 10 is shown mounted on a fishing rod 14.

The loading apparatus which is the subject of this invention is generally denoted as 15 and is also mounted upon the rod 14 forward of the location of reel 10. The apparatus 15 is mounted upon rod 14 by means of a clamp comprising a lower element 16 and an upper element 17. Both elements 16 and 17 are elongated and grooved so as to fit around the circumference of a fishing rod. The inner surfaces of these grooves are lined with a rubber lining so as to better grip the rod. The clamp is formed with a depending ledge 18 formed integrally with element 16. Element 17 is rotatably journalled on a threaded shaft 20 which is capped by a knurled head 21 and is threadably engaged through an aperture in ledge 18. By rotating head 21, the elements 16 and 17 are forced together to secure the apparatus 15 on the rod 14. A mounting post 22 is formed integrally at one end of element 16 and extends parallel to the shaft 20 to complete the clamp assembly.

The post 22 is provided with an axial opening at its lower end. This opening receives a circular rod 23 which has formed thereon a flat mounting plate 24. Plate 24 is formed perpendicularly to the clamping elements 16 and 17. The upper end of rod 23 is formed with two perpendicular flat surfaces 25, 26. These surfaces serve as bearing areas for a set screw 27 which is threadably engaged through post 22 to thereby secure the rod 23 in one of two definite positions. As shown in FIGURES 1 and 2, rod 23 is locked with plate 24 in a plane perpendicular to the fishing rod 14. When used with level line reels, the rod 23 is locked with the plate 24 in a plane including the axis of rod 14 (see FIGURES 4 and 6–8).

Two parallel threaded holes 28 and 30 are cut through plate 24 and serve as alternate mounting apertures for the spool and bail assemblies. The bail assembly comprises a hollow threaded shaft 31 which is received in either hole 28 or 30 depending upon the elevation desired and is held by a lock nut 29. Shaft 31 terminates in an enlarged cylindrical head 32. The outer circumference of shaft 31 is not threaded adjacent to head 32, but is a smooth cylindrical bearing surface 33. Rotatably mounted on surface 33 is a collar 34 which is capped by two thin washers 35, 36 at each end thereof. A coiled spring 37 surrounds shaft 31 between washer 35 and plate 24. The end of spring 37 adjacent to plate 24 is hooked within the empty hole 28 or 30 so as to prevent spring 37 from rotating.

The collar 34 serves to mount a rotating arm 38 formed of small diameter cylindrical rod stock, bent at a right angle. A flattened area 40 formed along one leg of arm 38 serves as a positioning bearing for the arm 38 and is engaged by a set screw 41 threadably received in an aperture cut through the collar 34. Arm 38 is slidably mounted within collar 34 and is positioned by adjustment of set screw 41. A line guide 42 is frictionally held on the remaining leg of rotating arm 38. Guide 42 is formed of bent stiff wire and is provided with a small eye 43 through which line is fed from the apparatus.

The end of shaft 31 which extends beyond plate 24 is provided with a square axial aperture 44 which is continued through shaft 31 as a cylindrical aperture 45 (see FIGURE 8). These apertures receive an elongated shaft 46 on which is formed a winged head 47 and a square shank 48. The square shank 48 is adapted to lock within the square aperture 44 within shaft 31. Shaft 46 has a smooth cylindrical portion 50 adjacent to shank 48, which terminates in a shoulder 51 that defines the longitudinal boundary of an elongated flat area 52 cut along the remaining length of shaft 46. The partially cylindrical portion of shaft 46 beyond shoulder 51 is threaded and is denoted by the numeral 53.

A first spool engaging wheel 54 is slidably mounted on shaft 46 adjacent to head 32 on shaft 31. Wheel 54 is circular in shape and is formed of a metal backing plate 55 and a bonded rubber friction plate 56 which is designed to grip the spools 57 which are purchased with the line. A pair of collars 59 are shown on shaft 46. Collars 59 adapt the shaft for mounting of various sized spools 57 upon which fishing line is normally sold. The spools 57 are mounted on collars 56 adjacent one another and are bounded by a second spool engaging wheel 58 formed identically to wheel 54. An enlarged washer 60 is placed on shaft 46 adjacent to wheel 58. Washer 60 is rotatably locked to shaft 46 by a central aperture corresponding to the shape of shaft 46 along flat area 52. A small circular washer 61 and a lock nut 62 complete the assembly on shaft 46.

The operation of this apparatus is shown for a spinning reel 10 requiring counter-clockwise feeding. Two spools 57a and 57b are loaded on shaft 46. The spools have connected line on them for continuous loading. Spool 57a will be emptied first. If reel 10 requires clockwise loading, spool 57b will be unloaded first with both spools being reversed. The lock nut 62 is then tightened to press the enlarged washer against wheel 58 and thereby lock the entire spool assembly to shaft 46. Next lock nut 29 is loosened. The winged head 47 on shaft 46 is turned to thereby rotate shaft 31 due to the interconnection of shank 48 and aperture 45. This moves collar 34 with respect to plate 24 to increase or decrease the tension on spring 37. In this manner, the frictional drag on collar 34 can be adjusted to the desired amount for proper loading. When the drag is adjusted, the lock nut 29 is tightened against plate 24 to thereby lock the entire assembly against rotation—the lone exception being collar 34. The line guide 42 is then moved to a position beyond the spool being loaded and the line is threaded through eye 43 and is connected to the spool of reel 10. The reel 10 is then actuated by handle 13 in the normal manner used to retrieve line. Line will be pulled by bail 12, which will revolve arm 38 since the spools 57 are held stationary. Therefore, line will be fed from spools 57 in precisely the same manner in which it is loaded onto the reel 10 with no resulting twist. The tension on the line is easily varied by repositioning shaft 31. When spool 57a is emptied, guide 42 is moved to a position adjacent spool 57b and that spool is emptied with a continuous effort. Since the spools 57 are gripped as a unit, no individual adjustment of the drag is required.

This same apparatus is readily convertible for use in loading or unloading a level-wind casting reel. This type of reel utilizes a spool which is revolved by a handle. In this application, rod 23 is rotated 90 degrees from its spinning reel position by adjustment of set screw 27. This positions shaft 46 parallel to the axis of the casting reel. The rotating arm 38 is now extraneous. It may be removed, or may be shifted so as to abut clamp element 17 to remain motionless. The only other change is that a round washer 74 is placed between head 32 and wheel 54 to allow relative rotation between these elements. The washers 60 and 61 are reversed so as to allow relative rotation between wheel 58 and lock nut 62. The result is that spools 57 are now rotatable on shaft 46, while the remainder of the assembly is locked as before.

Line is then fed directly from spools 57 to the reel. The spools 57 are free to rotate. Drag on the spools 57 may be adjusted by turning lock nut 62. The position of lock nut 62 is insured by washer 60 which cannot rotate with respect to shaft 46. This prevents any variance in the drag as line is being dispensed.

To unload the level line reel the same general arrangement is utilized (FIGURE 7). A handle 75 is placed on shank 48 of shaft 46 so as to be able to rotate shaft 46 relative to the stationary shaft 31. The non-rotatable washer 60 is placed between shoulder 51 and wheel 54 to thereby lock the spools 57 for rotation with shaft 46.

A rotatable washer 61 is used between wheel 58 and lock nut 62, which clamps the assembly as a unit.

The handle 75 may then be rotated to take line from the reel and wind it on spools 57. The tension of the line on spools 57 may be adjusted by use of the drag commonly available on level-wind reels.

In loading spinning reels that do not have the spool and pick up bail or arm enclosed, if the bail 12 and the member 38 do not move exactly in synchronism, then one may be close to the rod when the other is spaced from the difficulty in winding. To avoid such difficulty I provide a guide 67 to center the line between the device 15 and the reel 12 as illustrated in FIGURE 1. The guide 67 is formed with a clamp 68 which is tightened about the rod 14 by a bolt 70 and a wing nut 71. The guide 67 has an arm 72 provided with a coil tip 73 through which the line is extended.

Thus, an extremely versatile fishing line dispensing and unloading device is provided which is readily adaptable to any spinning or level-line casting reel. It is also adaptable to any revolving spool reel, such as a fly reel or trolling reel. It may be used with an open-faced or closed-face spinning reel of any size or capacity. It requires no work space, since it clamps directly upon the fishing rod.

It is certain that minor mechanical improvements may present themselves to one skilled in this art within the limits of this invention. For this reason the following claims are intended to be the controlling definitions of the inventive boundaries of the device.

Having thus described my invention, I claim:

1. An apparatus adapted to dispense fishing line to a stationary spool reel mounted on a fishing rod comprising:

clamp means adapted to be secured to the rod at a location spaced from the reel;

a stationary base adapted to be fixedly secured to said clamp means in a position perpendicular to the rod;

an aperture having internally cut threads formed through said base spaced from said clamp means and extending axially parallel to the rod;

a hollow shaft having an outside threaded portion at one end thereof which is threadably engaged within said aperture and extends therethrough beyond said base, said shaft further comprising an internal socket formed axially at said one end, the remaining end of said hollow shaft comprising an outside bearing surface terminating in a raised annular abutment;

a revolvable collar rotatably journalled on said outside bearing surface adjacent said raised annular abutment;

a bent rod adjustably mounted on said collar including a first section extending outwardly from the collar perpendicular to the axis of the collar, and a second section bent at a right angle relative to said first section and extending outwardly from said base;

an adjustably positionable line guide frictionally mounted on said second section of said rod;

a compression spring journalled about said hollow shaft intermediate said collar and said base, said spring being non-rotatably connected to said base and being adapted to frictionally abut the adjacent end of said collar;

an elongated shaft mounted coaxially through said hollow shaft and having a complementary shoulder formed at one end non-rotatably received within the internal socket of said hollow shaft, said elongated shaft extending outwardly from said base beyond the raised annular abutment of said hollow shaft;

a lock nut threadably engaged on said one end of said hollow shaft adapted to frictionally engage the adjacent surface of said base;

and means mounted on said elongated shaft adapted to non-rotatably mount a supply spool of fishing line thereon.

2. The device as defined in claim 1 further comprising:
a wing nut formed integrally with said elongated shaft adjacent said shoulder adapted to facilitate manual adjustment of said hollow shaft within said aperture when said lock nut is released, to thereby vary the frictional engagement of said spring against said collar.

3. The device defined in claim 1 wherein said last named means comprises:
a first wheel mounted coaxially on said elongated shaft adjacent to and abutting said remaining end of said hollow shaft, said first wheel including a frictional face directed outwardly from said base adapted to abut one side of a supply spool;
a second wheel mounted coaxially on said elongated shaft spaced from said first wheel, said second wheel including a frictional face directed toward said base adapted to abut the remaining side of a supply spool;
and locking means engaged on said elongated shaft adapted to frictionally lock said collar, first and second wheels and the supply spool as a unit to thereby maintain the supply spool in an immovable position relative to the base.

References Cited in the file of this patent

UNITED STATES PATENTS

| | | |
|---|---|---|
| 1,971,000 | Field | Aug. 21, 1934 |
| 2,498,987 | Duncan | Feb. 28, 1950 |
| 2,734,693 | Rabezzana | Feb. 14, 1956 |
| 2,848,778 | Plummer et al. | Aug. 26, 1958 |
| 2,918,227 | Mauborgne | Dec. 22, 1959 |

FOREIGN PATENTS

| | | |
|---|---|---|
| 721,328 | Great Britain | Jan. 5, 1955 |